(12) United States Patent
Hawthorn et al.

(10) Patent No.: US 6,808,205 B2
(45) Date of Patent: Oct. 26, 2004

(54) AIRBAG MODULE HAVING VARIABLE TETHER SYSTEM

(75) Inventors: Laura A. Hawthorn, Tipp City, OH (US); Stephanie L. Dunkle, Springboro, OH (US); Ann L. Kneisly, Dayton, OH (US); Mark T. Winters, Vandalia, OH (US); Ryan T. Pinsenschaum, Vandalia, OH (US); Patrick Schatz, Lebanon, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/353,661

(22) Filed: Jan. 29, 2003

(65) Prior Publication Data

US 2004/0104564 A1 Jun. 3, 2004

Related U.S. Application Data

(60) Provisional application No. 60/430,487, filed on Dec. 2, 2002.

(51) Int. Cl.$^7$ .............................................. B60R 21/16
(52) U.S. Cl. ................................................. 280/743.2
(58) Field of Search ......................... 280/743.2, 743.1, 280/733, 732, 731

(56) References Cited

U.S. PATENT DOCUMENTS

| | | | |
|---|---|---|---|
| 5,887,894 A | * | 3/1999 | Castagner et al. ........ 280/743.2 |
| 6,334,627 B1 | * | 1/2002 | Heym et al. ............. 280/743.2 |
| 6,390,501 B1 | * | 5/2002 | Greib et al. ............. 280/743.2 |
| 6,422,597 B1 | | 7/2002 | Pinsenschaum et al. |
| 6,425,603 B1 | | 7/2002 | Eschbach .................... 280/743 |
| 6,454,300 B1 | | 9/2002 | Dunkle et al. |
| 6,561,545 B2 | * | 5/2003 | Greib et al. ............. 280/743.2 |
| 6,592,146 B2 | | 7/2003 | Pinsenschaum et al. |
| 2001/0035637 A1 | | 11/2001 | Thomas et al. |
| 2002/0036400 A1 | | 3/2002 | Winters et al. |
| 2002/0117840 A1 | | 8/2002 | Dunkle et al. |
| 2002/0158456 A1 | | 10/2002 | Fischer ....................... 280/743 |

FOREIGN PATENT DOCUMENTS

| | | |
|---|---|---|
| EP | 0 586 131 | 3/1994 |
| WO | 9631370 | 10/1996 |

* cited by examiner

Primary Examiner—Faye M. Fleming
(74) Attorney, Agent, or Firm—Scott A. McBain (57) ABSTRACT

A variable tether system adapted for use in an inflatable cushion of an airbag module having a first pair of tether elements each having a first end and a second end, the first ends each being secured to inner portions of the inflatable cushion and the second ends each being secured to inner portions of the inflatable cushion, the first ends each being secured to the inflatable cushion at positions remote from the second ends and the second ends being secured to the inflatable cushion at a location closer to an inflation opening of the inflatable cushion than the first ends, wherein each of the first pair of tether elements has a portion between each of the first and second ends which is not secured to the inflatable cushion; and a second pair of tether elements each having a first side and a second side, the first side of one of said second pair of tether elements being secured to a portion of one of the first pair of tether elements and the first side of the other one of the second pair of tether elements being secured to the portion of the other one of the first pair of tether elements and the second sides are configured for being releasably secured to an actuation mechanism.

21 Claims, 6 Drawing Sheets

AIRBAG MODULE HAVING VARIABLE TETHER SYSTEM

CROSS REFERENCE TO RELATED APPLICATIONS

This application claims the benefit of U.S. Provisional Application 60/430,487 filed Dec. 2, 2002, the contents of which are incorporated herein by reference thereto.

This application is also related to U.S. patent application Ser. No. 09/951,809 filed on Sep. 13, 2001 and U.S. Pat. No. 6,422,597, which issued on Jul. 23, 2002, the contents of which are incorporated herein by reference thereto. This application is also related to U.S. Pat. No. 6,454,300, the contents of which are incorporated herein by reference thereto.

BACKGROUND

This disclosure relates generally to airbag modules for vehicles. Specifically, this disclosure relates to variable tether systems for inflatable cushions and airbag modules.

Airbag modules have become common in modern automobiles. An airbag module typically comprises an inflatable cushion and an inflator within a housing. The module is installed in a desired position within the vehicle, such as the steering wheel, the dashboard, the seat, the A-pillar, and other locations. The inflatable cushion is stored in a folded position within the housing in fluid communication with the inflator. In response to an activation event or occurrence, a sensor provides a signal for activating the inflator. The inflator provides a supply of inflating gas to the cushion to inflate the cushion, deploying it from the housing into the vehicle.

Various methods have been employed to more closely tie the inflation level of the inflatable cushion to specific conditions. For example, dual stage inflators have been used to increase or decrease the level of inflation of the inflatable cushion. Alternatively, variable venting schemes have been used to direct a portion of a generated inflation gas away from the cushion. Further, variable tethering systems have been used to restrict or vary the overall cushion volume.

SUMMARY

A variable tether system adapted for use in an inflatable cushion of an airbag module having a first pair of tether elements each having a first end and a second end, the first ends each being secured to inner portions of the inflatable cushion and the second ends each being secured to inner portions of the inflatable cushion, the first ends each being secured to the inflatable cushion at positions remote from the second ends and the second ends being secured to the inflatable cushion at a location closer to an inflation opening of the inflatable cushion than the first ends, wherein each of the first pair of tether elements has a portion between each of the first and second ends which is not secured to the inflatable cushion; and a second pair of tether elements each having a first side and a second side, the first side of one of said second pair of tether elements being secured to a portion of one of the first pair of tether elements and the first side of the other one of the second pair of tether elements being secured to the portion of the other one of the first pair of tether elements and the second sides are configured for being releasably secured to an actuation mechanism.

An airbag module having a variable tether system is also provided. The module comprises a housing, an inflatable cushion, an inflator, an actuation mechanism, and tether elements. The first tether element has a first end secured to a first inner portion of the inflatable cushion and a second end secured to a second inner portion of the inflatable cushion. The second tether element has a first side that mates with the first tether element at a point between the first and second ends. The actuation mechanism is configured to selectively retain or release the second side of the second tether element. The second tether element restrains the first tether element to a first length when the second tether element is retained so that the inflatable cushion expands to a first expanded state. The first length is less than a full length of the first tether element. The second tether element allows the first tether element to extend to the full length when the second tether element is released so that the inflatable cushion expands to a second expanded state.

An airbag module, comprising: a housing; an inflatable cushion for deployment from the housing; an inflator in fluid communication with the inflatable cushion and for providing a quantity of inflation gas to deploy the inflatable cushion from the housing; a variable tether system adapted for use in an inflatable cushion of an airbag module, comprising: a first pair of tether elements each having a first end and a second end, the first ends each being secured to inner portions of the inflatable cushion and the second ends each being secured to inner portions of the inflatable cushion, the first ends each being secured to the inflatable cushion at positions remote from the second ends and the second ends being secured to the inflatable cushion at a location closer to an inflation opening of the inflatable cushion, wherein each of the first pair of tether elements has a portion between each of the first and second ends which is not secured to the inflatable cushion; and a second pair of tether elements each having a first side and a second side, the first side of one of said second pair of tether elements being secured to a portion of one of said first pair of tether elements and the first side of the other one of the second pair of tether elements being secured to the portion of the other one of the first pair of tether elements, the second sides being configured for being releasably secured to an actuation mechanism.

The above-described and other features of the present disclosure will be appreciated and understood by those skilled in the art from the following detailed description, drawings, and appended claims.

DESCRIPTION OF THE PREFERRED EMBODIMENT

Figure 1:
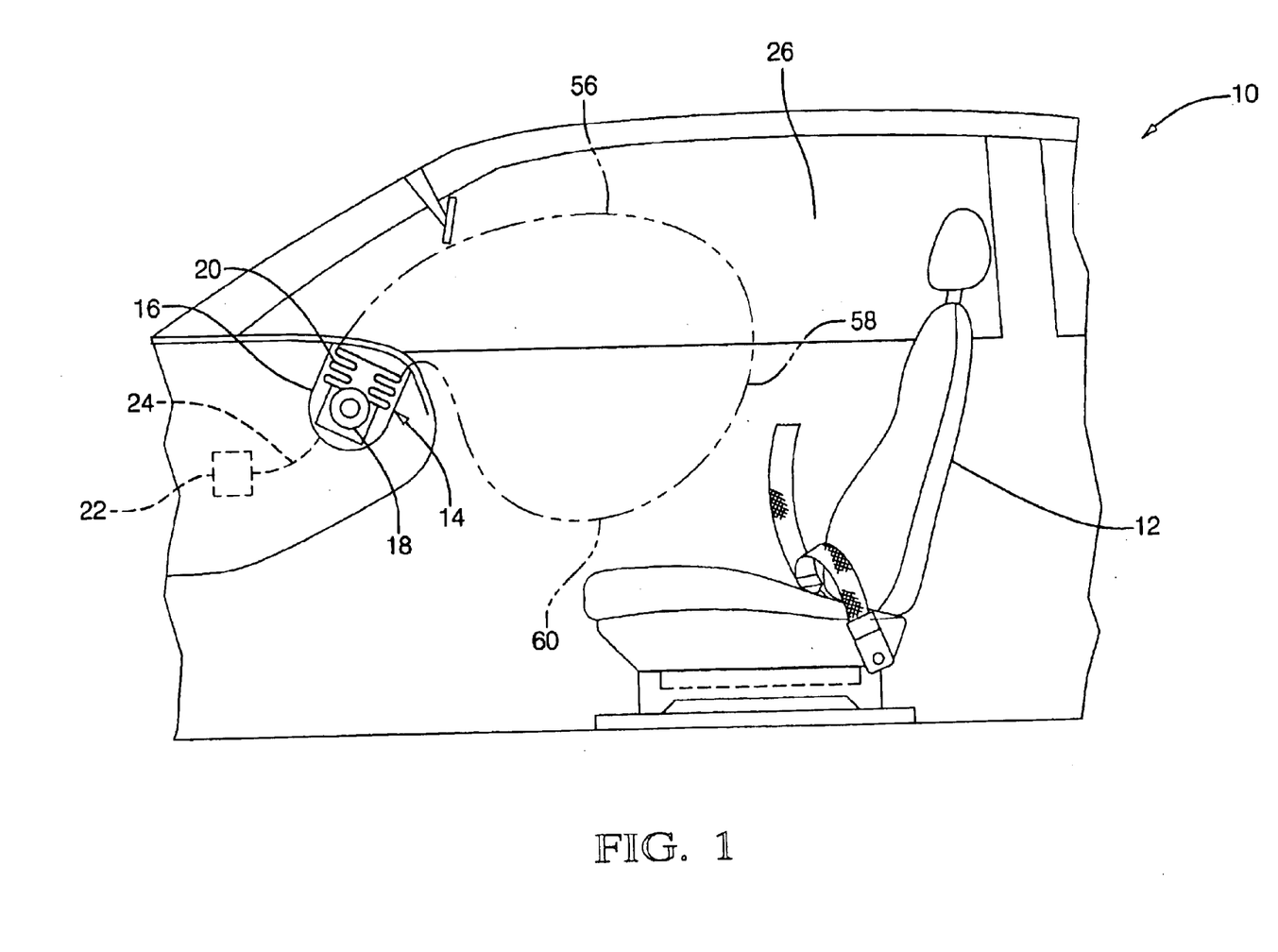
FIG. 1 is a schematic view of a vehicle interior having an airbag module.

Referring now to FIG. 1, a portion of a vehicle 10 is illustrated. Included in an interior compartment of vehicle 10 is a seating structure 12 and an airbag module 14 disposed in a selected spatial relationship with respect to the seating structure. Airbag module 14 comprises a housing 16, an inflator 18, and an inflatable cushion 20. Module 14 is positioned in vehicle 10 for deployment of cushion 20 away from housing 16 (e.g., rearward).

Inflator 18 can be a single stage inflator capable of releasing a single quantity of inflation gas into cushion 20. Alternately, inflator 18 can be dual stage inflator, adapted to release at least two levels of inflator gas into cushion 20. The inflator 18 can be, for example, a pure gas inflator, a hybrid inflator, pyrotechnic inflators, and others.

A sensor or sensing-and-diagnostic module 22 is adapted to detect an activation event to provide an activation signal 24 to inflator 18. The detection of the activation event can be determined by one or more sensors disposed about the vehicle. Thus, module 22 controls the activation of airbag module 14 via activation signal 24.

Cushion 20 is stored in a folded or undeployed position in housing 16, and is in fluid communication with inflator 18. Upon detection of an activation event by sensing-and-diagnostic module 22, inflator 18 is activated via signal 24 to generate an inflation gas. The inflation gas causes cushion 20 to inflate and expand from housing 16 into the interior compartment 26 of vehicle 10 as illustrated in phantom.

It should be recognized that module 14 is illustrated by way of example only as being included in the instrument panel or dashboard of vehicle 10. Of course, it is contemplated for module 14 to be installed in other regions of the vehicle 10, such as, but not limited to the steering wheel, the seat, the A-pillar, the roof, and other locations. In addition, the angular configuration of the module within the vehicle and its construction may also vary from those illustrated in the Figures.

Additionally, the present disclosure is also contemplated for use with various types of inflatable cushions and inflators. For example, cushions which are folded in a particular manner to achieve various deployment configurations and various types of inflators (e.g., dual stage inflators).

In addition, and in accordance with the present disclosure, the sensing-and-diagnostic module can also be adapted to detect one or more conditions of the seating structure. For example, sensing-and-diagnostic module 22 can be adapted to detect one or more of the following: a load or amount of load (e.g., occupant weight) on the seating structure 12, a position of the seating structure, an angle of a portion of the seating structure with respect to another portion, the distance the seating structure is from the air bag module 14, and other data that is relevant to the deployment of the airbag by receiving input from a plurality of sensors disposed about the vehicle.

For example, the sensing-and-diagnostic module can receive inputs from one or more sensors such as, but not limited to, a seat position sensor, an optical scanner, a load sensor, a seat recline sensor, a seat belt use detection sensor, and a belt tensioning sensor. The sensors are positioned to provide input signals to module 22 indicative of one or more seat conditions. The one or more seat conditions combined with an occupant's size (e.g., weight determined by sensors) is inputted in a control algorithm resident upon a microprocessor disposed within the sensing and diagnostic module in order to determine a desired deployment scheme for the inflatable cushion. For example, the data inputs when compared to a look up table stored in the memory of the microprocessor or other readable format will allow the algorithm to determine whether a full deployment or partial deployment of the airbag is desired (e.g., tailoring of the airbag module by activating or not activating a system designed to modify the cushion deployment characteristics).

The continuous sampling of the various sensors allows the sensing and diagnostic module to determine before an activation event (deployment) what type of deployment is desired. It is noted that the releasable tether device of the present disclosure is contemplated for use with any combination of the aforementioned sensors and it is not intended to be limited by the specific types of sensors discussed above. For example, the system is capable of operating with a single sensor input (e.g., occupant weight) or a multitude of inputs (e.g., occupant weight, seat position, seat belt operation, occupant height, etc.). Thus, any combination of sensors and sensor inputs may be used in order to assist with the deployment of the airbag.

The seat position sensor detects the position or distance of seating structure 12 with respect to air bag module 14. Similarly, the optical scanner can be used to detect the position of seating structure 12. The load sensor is disposed within the seating structure 12 and can be used to detect the load on the seating structure. Thus, load sensor is capable of detecting the specific weight or load on a portion of seating structure 12. The seat recline sensor can be used to detect the degree or angle to which an upper or back portion of the seating structure 12 is reclined or positioned with respect to a lower or seat portion of seating structure 12. The seat belt use detection sensor can determine whether the seat belt is secured (e.g., buckled is inserted into its corresponding clasp). The seat belt tensioning sensor, alone or in combination with the load sensor, can also be used to determine the load on the seating structure 12.

The airbag module in one embodiment of the present disclosure comprises a variable tether system that is adapted to provide the cushion with at least one of two expanded states, namely a first expanded state and a second expanded state. The variable tether system allows the cushion to expand a first distance from the housing in the first expanded state. The variable tether system also allows the cushion to expand a second distance from the housing in the second expanded state. The second distance is larger than the first distance. Thus, the variable tether system allows the cushion to extend farther from the housing when in the second expanded state then when in the first expanded state.

Figure 2:
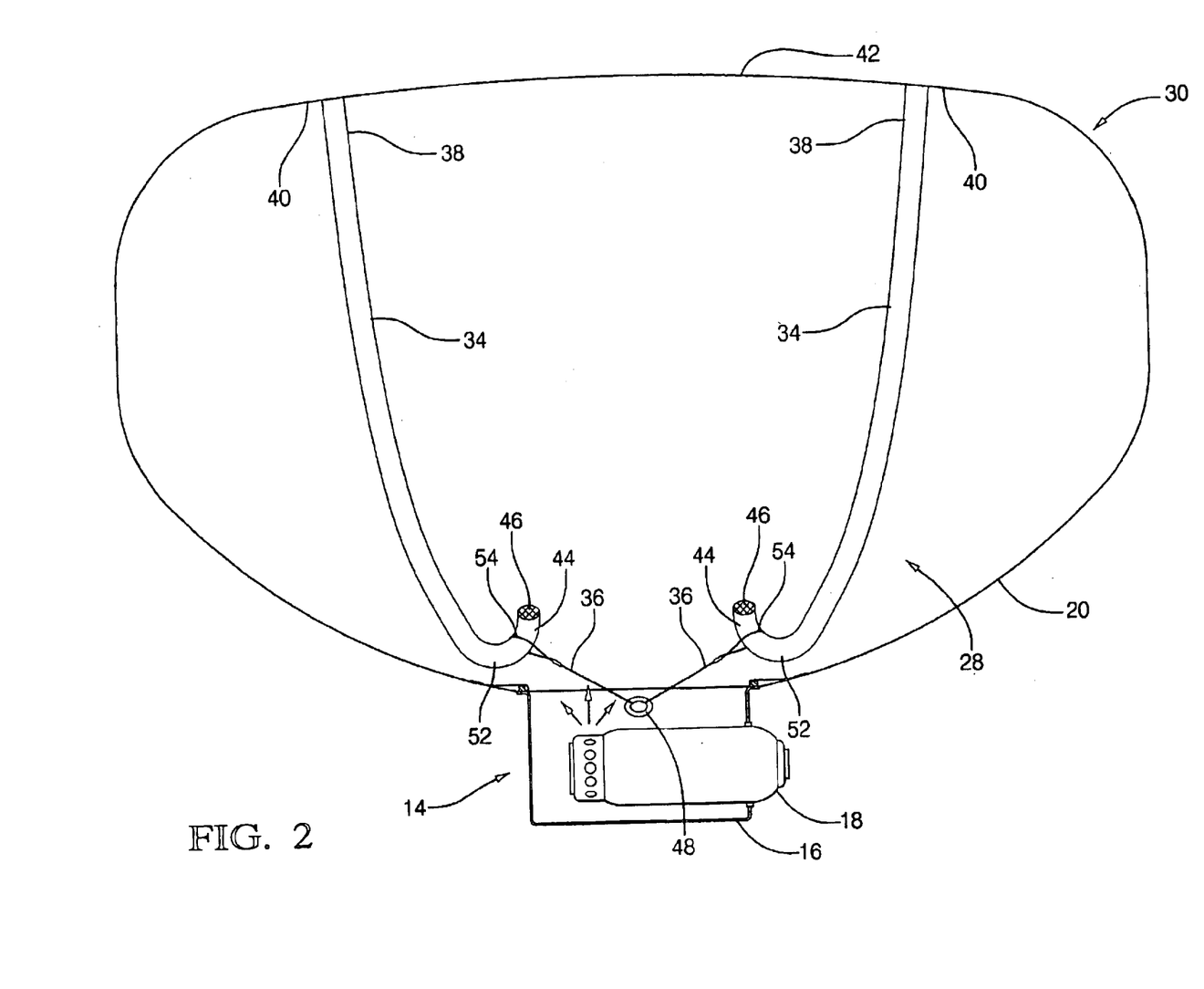
FIG. 2 illustrates an airbag module having an exemplary embodiment a variable tether system in a first expanded state.
Figure 3:
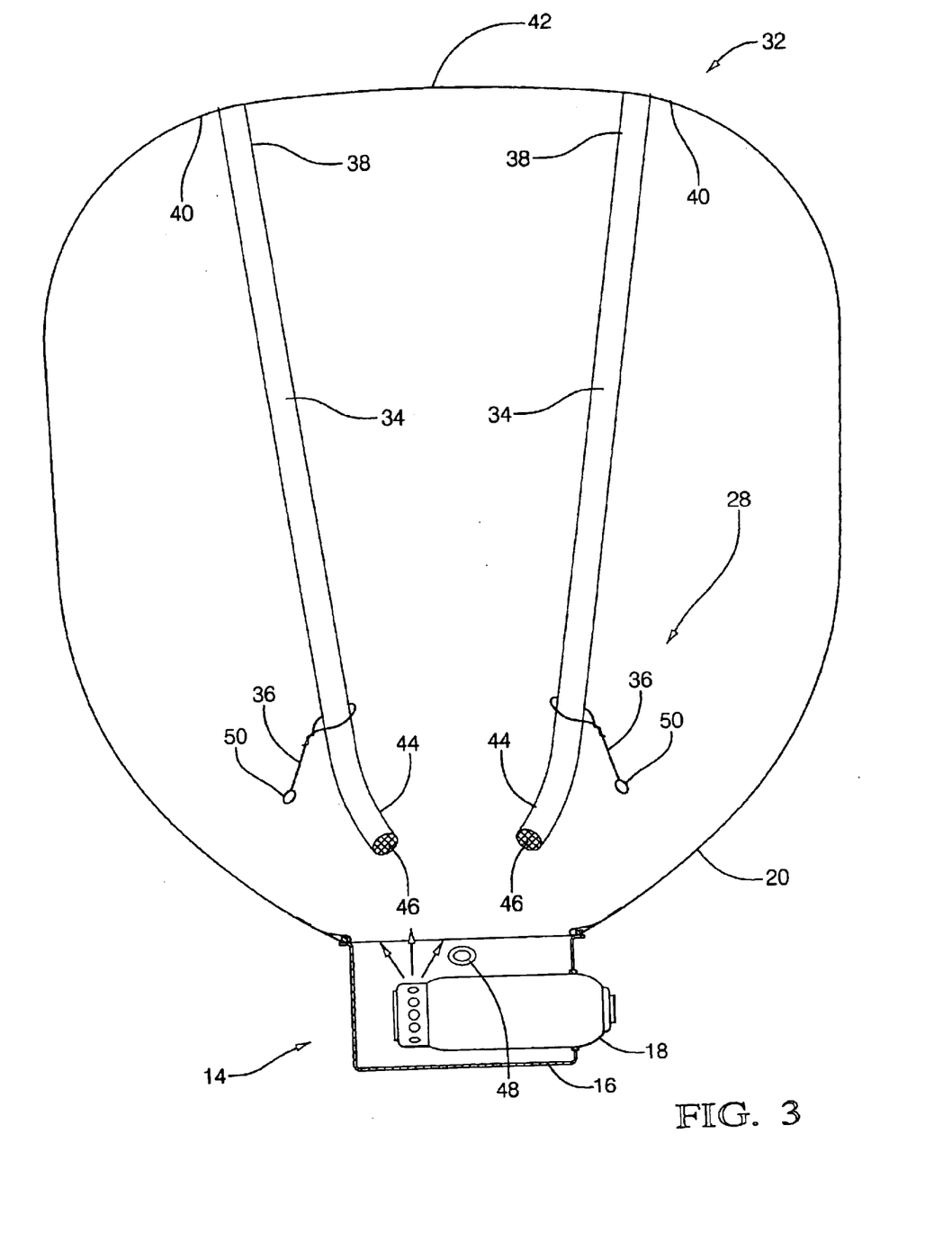
FIG. 3 illustrates the variable tether system of FIG. 2 in a second expanded state.

An exemplary embodiment of airbag module 14 having a variable tether system 28 is illustrated in FIGS. 2–3. FIG. 2 illustrates variable tether system 28 restraining cushion 20 to a first expanded state 30, while FIG. 3 illustrates the variable tether system allowing the cushion to expand to a second expanded state 32. The states illustrated in the figures are provided as examples and the present disclosure in not intended to be limited by the specific configurations illustrated as the first and second expanded states.

Variable tether system 28 comprises one or more first tether elements 34 each cooperating with a second tether element 36. For purposes of clarity only, variable tether system 28 is described and illustrated herein as including two first tether elements 34 and two second tether elements 36. Of course, variable tether system 28 having more or less than two of each of the tether elements is contemplated. For example, multiple pairs of tether elements each being secured to other parts of the inflatable cushion are contemplated. In addition, an odd number of tether elements are also contemplated for use with the variable tether system of the present disclosure. The above configurations are provided as possible examples of alternative tether schemes of course, other configurations are contemplated for use with the present disclosure.

A first end 38 of each first tether element 34 is secured to a first inner portion 40 of cushion 20. First inner portion 40 is remote from the housing 16 and is located at a position, which modifies the deployment configuration of the cushion, for example, first inner portion 40 can be proximate to a seating structure facing side 42 of the cushion. A second end 44 of each first tether element 34 is secured to a second inner portion 46 of cushion 20. Second inner portion 46 is proximate housing 16. First tether elements 34 can be secured to first and second inner portions 40 and 46 by, for example, sewing the first tether elements to the cushion. Of course, the locations of the tether securement and subsequent cushion configuration may vary.

Cushion 20, first tether elements 34, and second tether elements 36 can be formed of material that is pliable such as a woven or knitted textile having a construction resistant to substantial elongation upon the application of tensile forces. A woven structure of nylon yarns is an example of such a material. Alternatively, the tether elements are constructed out of a non-woven material or cord as well as materials that are not resistant to elongation.

Figure 6:
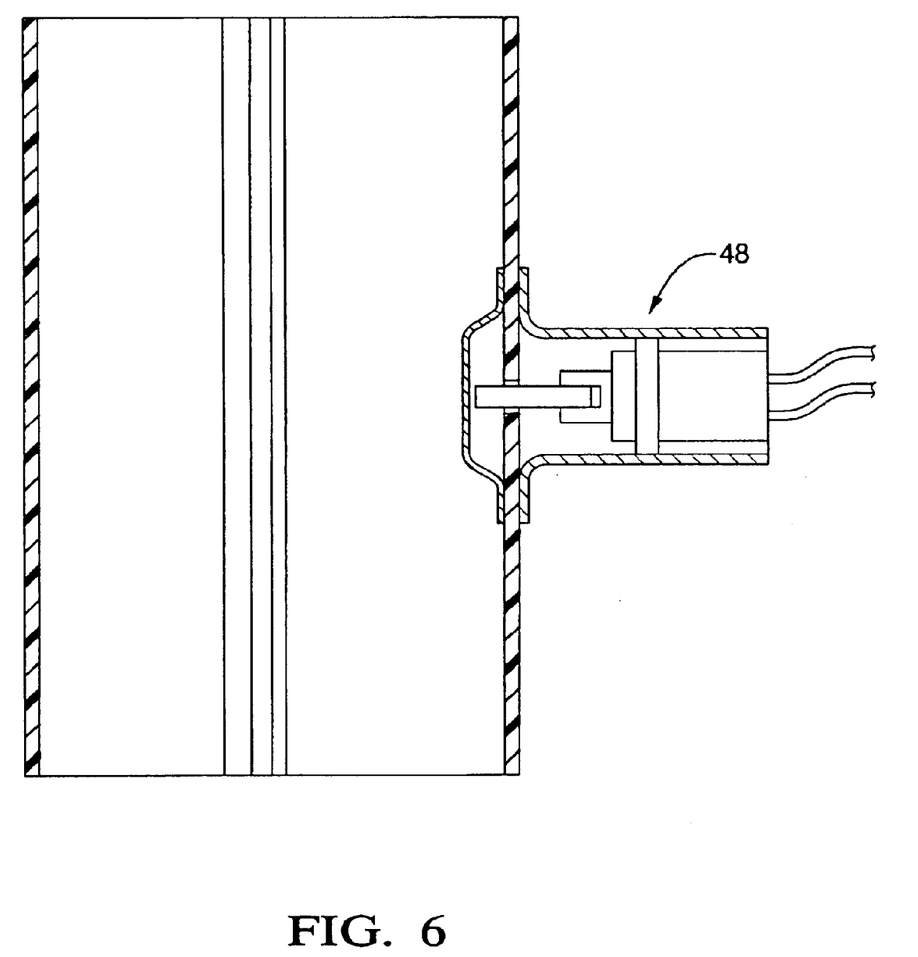
FIG. 6 illustrates an actuation mechanism.

Each second tether element 36 is configured to releasably secure first tether elements 34 to an actuation mechanism which can be secured to housing 16. For example, variable tether system 28 can comprise an actuation mechanism 48 activatable for releasably securing the second tether elements at one end. In one embodiment, the actuation mechanism comprises an actuatable plunger for releasably securing one end of second tether 36. In one embodiment actuation mechanism 48 is disposed on housing 16. Of course, the location of actuation mechanism 48 may vary as long as it is able to provide its function of releasably securing one end of second tether element 36. An example of actuation mechanism 48 is illustrated in FIG. 6. Another example of actuation mechanism 48 is also found in U.S. Pat. No. 6,422,597, which is incorporated herein by reference thereto. Other examples of contemplated actuation mechanisms are found in commonly owned and assigned U.S. patent application Ser. No. 10/295,932 filed on Nov. 15, 2002, the contents of which are also incorporated herein by reference thereto. Thus, it is contemplated that actuation mechanism 48 is any one of the device disclosed in the aforementioned patents and patent applications or equivalents thereof.

Regardless of the type of actuation mechanism used to secure the ends of second tether elements 36, each actuation mechanism is configured to be actuated by a signal received from the sensing and diagnostic module or other controller, which corresponds to multiple vehicle, occupant and other signals that are received and analyzed by the sensing and diagnostic module allowing for multiple deployment schemes wherein the second tether elements are released or remain secured or a combination of both. Upon receipt of the signal, before and/or during deployment the actuation mechanism (e.g., solenoid, pyrotechnic device, initiator etc.) releases one end of second tether element 36.

Actuation mechanism 48 can be configured to receive a loop 50 of each second tether element 36. A portion of member 48 can be configured to be retracted from loop 50 by an actuator, such as a pyrotechnic actuator or a solenoid, to release the loop, and thus second tether elements 36, from housing 16.

When actuation mechanism 48 secures second tether elements 36 to housing 16 or other location, cushion 20 is allowed to expand to first expanded state 30. Here, second tether elements 36 restrict the length of the first tether elements 34 to less than their full length. The full length of the first tether elements 34 is defined as the distance between first end 38 and second end 44. Specifically, second tether elements 36 restricts the length of the first tether elements 34 to the distance defined between first end 38 and a point 52, where point 52 is the location of contact between the first and second tether elements. Thus, the second tether elements limit the distance that cushion 20 can extend from housing 16 in first expanded state 30.

Second tether elements 36 can be secured to first tether elements 34 at point 52 by, for example, sewing the first and second tether elements to one another. Alternately, a looped portion or metal eyelet 54 of second tether elements 36 is loosely received on first tether elements 34 such that when the second tether elements are secured to housing 16, the looped portions 54 are slidably secured to the first tether elements for movement about the first tether element until point 52 is defined. It is noted that the present disclosure is not intended to be limited to the specific securement locations (fixed or slidably) depicted by point 52 in the figures, which is provided as an example of a location however, the location of point 52 may vary.

The amount that second tether elements 36 restrict the length of first tether elements 34 can be adjusted by changing the length of the first tether elements, the second tether elements, by changing the location of point 52 on the first tether elements, and any combination thereof.

When second tether elements 36 are released from housing 16, cushion 20 is allowed to expand to second expanded state 32. Here, first tether elements 34 expand to their full length (between inner portion 40 and inner portion 46) to allow cushion 20 to expand to second expanded state. Accordingly, the second expanded state is defined by the location and length of first tether elements 34. First tether elements 34 can be located anywhere within the inflatable cushion to provide the desired configuration of the second expanded state. For example, first tether elements may in one embodiment run along a side of cushion 20 such that the second expanded state is defined by the cushion itself. Alternatively, the end of the first tether elements are secured at positions within the inflatable cushion such that the cushion and the second expanded state is defined by the first tether elements. Of course, multiple configurations and locations of first tether element are contemplated in accordance with the present disclosure.

Second tether elements 36 secure first tether elements 34 to housing 16 or other location to restrict the length of the first tether elements to less than their full length, which restricts cushion 20 to first expanded state 30. Releasing second tether elements 36 from actuation mechanism 48 allow first tether elements 34 to extend to their full length, and thus cushion 20 is expanded to second expanded state 32. In this manner, variable tether system 28 is configured to provide cushion 20 with an adjustable expanded state.

In one embodiment of variable tether system 28, each of the first and second tether elements are separate and distinct from one another, and the second tether elements are all secured to housing 16 at a central point, namely at actuation mechanism 48 wherein the activation of one mechanism (e.g., actuation mechanism 48) can release second tether elements 36 to change between the first and second expanded states.

Since the tether elements are separate and distinct from one another, each of the first and second tether elements can be configured to tailor the first and second expanded state of cushion 20 differently. For example, each of the first and second tether elements can have a different length. Additionally, some of the first and second tether elements can be adapted to shape different regions of cushion 20. In this example, some of the tether elements can shape upper regions 56 (FIG. 1) of the deployed cushion, other tether elements can be adapted to shape central regions 58 of the deployed cushion, and yet other tether elements can be adapted to shape lower regions 60 of the deployed cushion. The separate nature of the first and second tether elements, when combined with the central nature of actuation mechanism 48 for the second tether elements provide a simple and easy system to shape the cushion and provides more flexibility in shaping the cushion than previously possible.

In addition, and as an alternative embodiment and in order to provide multiple deployment configurations of the inflatable cushion, additional actuation mechanisms are contemplated for selectively releasing one or more second tether element 36 wherein the cushions characteristics are further modified. Thus, for example a third state is available wherein only one of the second tether elements is released while the other one remains secured. In this embodiment, the cushion would expand to third state, which has a deployed configuration between the first and second states.

It should be recognized that actuation mechanism 48 is described above by way of example only. Of course, alternate actuation mechanisms configured to releasably secure second tether elements 36 to housing 16 or other location are contemplated for use with the present disclosure. For example, a portion of actuation mechanism 48 can be configured to move loop 50 off the member to release second tether element 36 from housing 16.

Alternately, actuation mechanism 48 can be configured to sever (e.g., cut or burn) a portion of loop 50 to release second tether elements 36 from housing 16. In this embodiment the portions to be severed are located proximate to a device for facilitating the cutting and/or burning of the loop. In one embodiment, a separate initiator is positioned to provide the burning of the loop. Alternatively, a solenoid or actuator is positioned to sever the loop by manipulating a cutting device, which will sever the loop at the required time.

In yet another alternative, the portion of loop 50 to be severed is positioned in close proximity to the diffuser openings of the inflator wherein the inflation gas, if hot enough is used to sever the loop portion. Of course, in this embodiment the loop portion will always be cut. However, the time at which the portion is cut will depend upon the thickness of the loop and the type of material, thus a smaller thickness will burn more quickly than a thicker loop portion. Therefore, the loop portions in this embodiment are configurable to be released at a certain time during deployment based upon the thickness of the loop, which is previously determined. Accordingly, any means of releasably attaching second tether elements 36 to housing 16 or other location are contemplated to be within the scope of the present disclosure.

Further, it should be recognized that variable tether system 28 is described above by way of example only as including one actuation mechanism 48, which provides cushion 20 with the first and second expanded states. Of course, it is contemplated for variable tether system 28 to include more than one actuation mechanism in order to provide more adjustment for more than two expanded states. For example, and as one alternative the tethers are secured and configured to restrict deployment in a radial direction (e.g., cross car) as well as fore and aft (towards vehicle seat). In yet another alternative, the tethers are secured and configured to only restrict deployment in either a radial direction (e.g., cross car) or fore and aft (towards vehicle seat).

In addition, it is also noted that while a single plane view is illustrated in the figures it is contemplated that multiple pairs of tethers in successive planes each having their own release mechanism are contemplated for use in the present disclosure. In this embodiment, the multiple pairs can be released simultaneously, sequentially or according to inputs received by the sensing and diagnostic module as well as each pair of tethers having two actuation mechanisms or a single actuation mechanism adapted to release only one of a pair of the releasable tethers. Of course, and depending on either a predetermined deployment configuration or an actively adapted system using the inputs received by the sensing and diagnostic module, one only of the multiple pairs of tethers may be released while the others remain un-released. In this manner multiple variations of deployment configurations are available, each of which can be determined by the inputs received by the sensing and diagnostic module.

Figure 4:
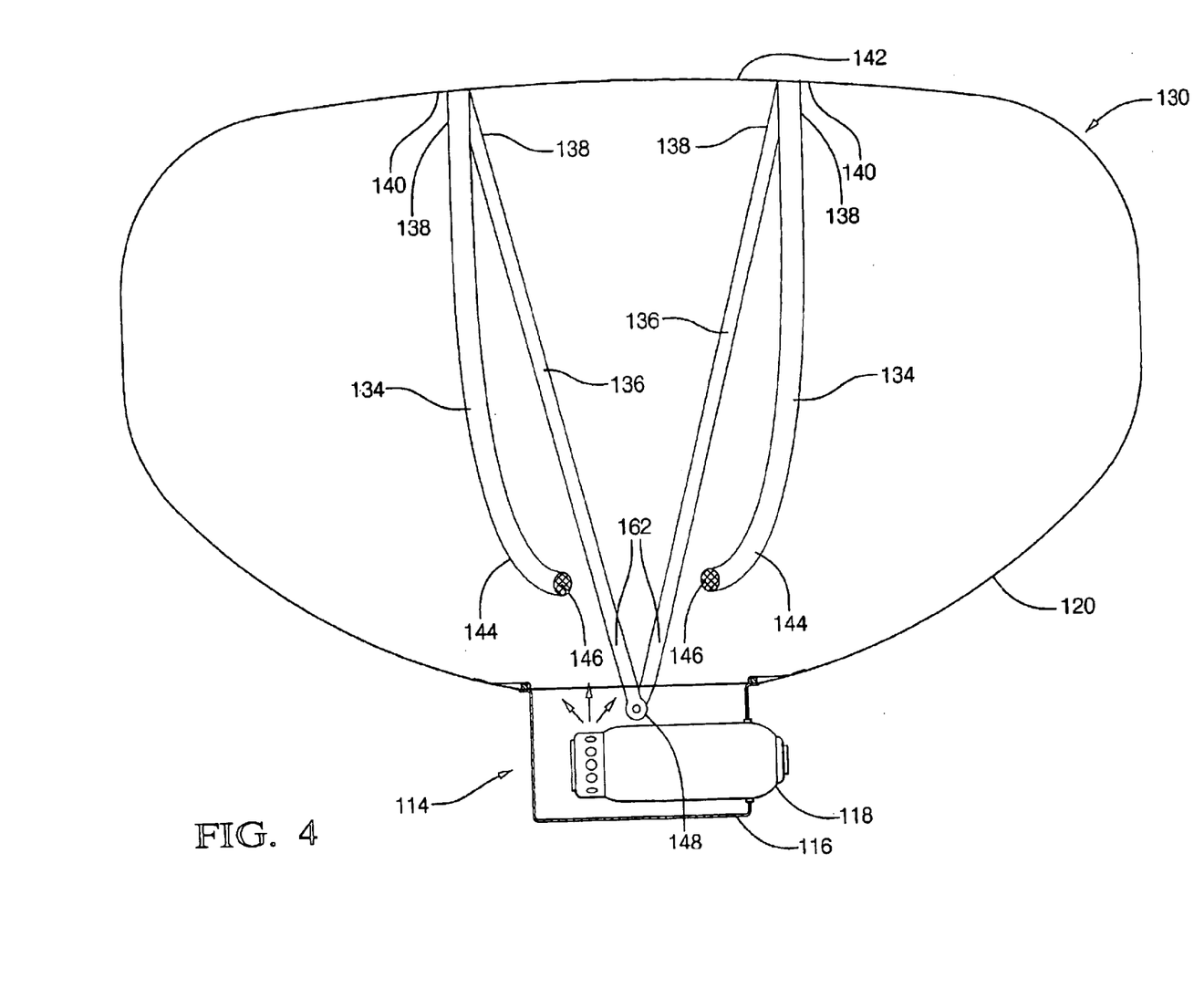
FIG. 4 illustrates an alternative embodiment of the present disclosure in a first expanded state.
Figure 5:
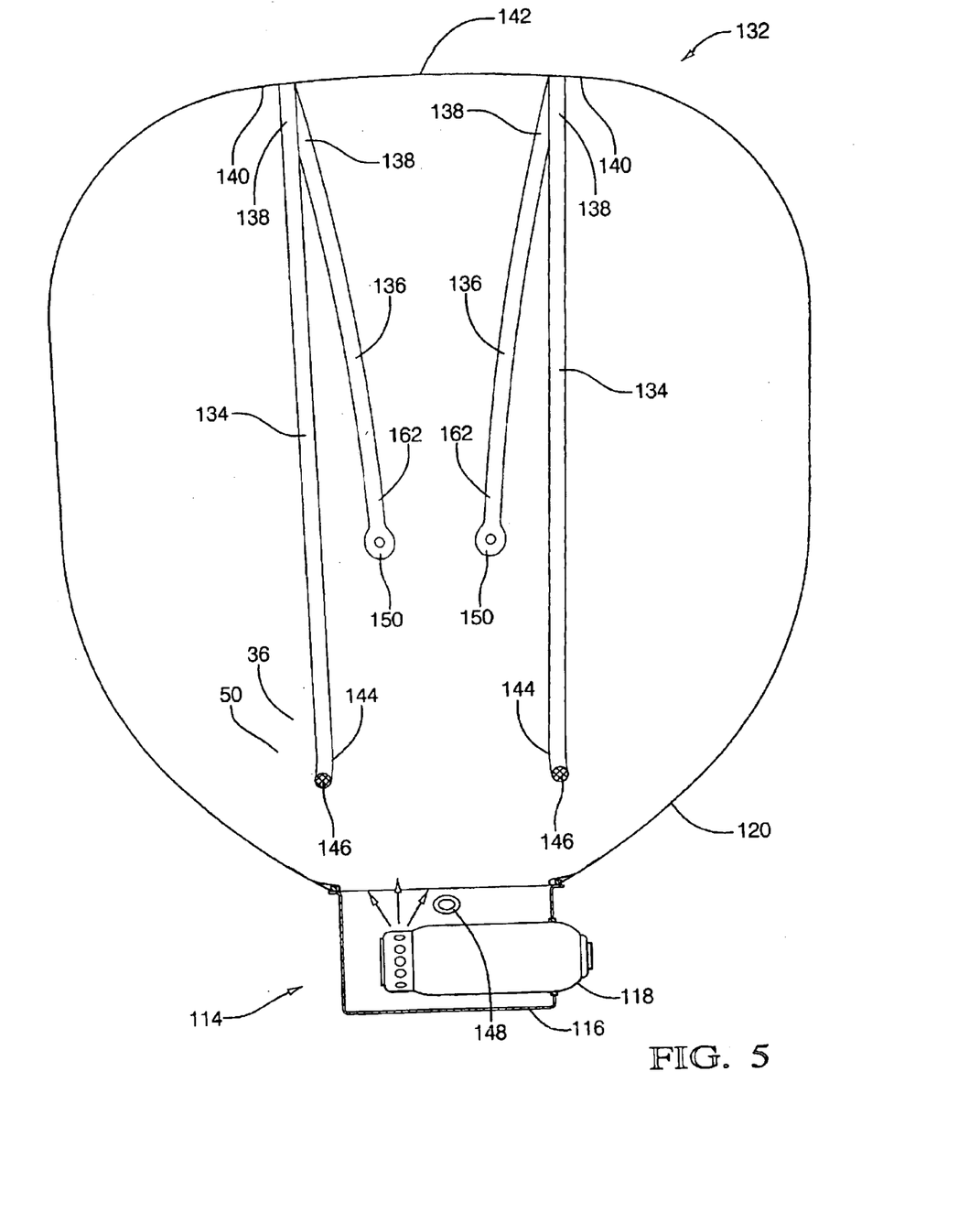
FIG. 5 illustrates the variable tether system of FIG. 4 in a second expanded state.

Turning now to FIGS. 4–5, an alternate exemplary embodiment of an airbag module 114 having a variable tether system 128 is illustrated. Here component parts performing similar or analogous functions are labeled in multiples of one hundred. FIG. 4 illustrates variable tether system 128 restraining cushion 120 to a first expanded state 130, while FIG. 5 illustrates the variable tether system allowing the cushion to expand to a second expanded state 132.

Variable tether system 128 comprises one or more first tether elements 134 each having a second tether element 136. Again, variable tether system 128 is described and illustrated herein as including two first tether elements 134 and two second tether elements 136. Of course, variable tether system 128 having more or less than two of each of the tether elements is contemplated.

A first end 138 of first and second tether elements 134 and 136 are secured to a first inner portion 140 of cushion 120. First inner portion 140 is proximate a seating structure facing side 142 of the cushion. A second end 144 of each first tether element 134 is secured to a second inner portion 146 of cushion 120, where the second inner portion is proximate housing 116. Tether elements 134 and 136 can be secured to first and second inner portions 140 and 146, respectively, by, for example, sewing the tether elements to the cushion.

A second end 162 of each second tether element 136 is configured to be releasably secured to housing 116 or other location. For example, variable tether system 128 can comprise an actuation mechanism 148 disposed on housing 116 or other location. Actuation mechanism 148 is configured to receive a loop 150 of each second tether element 136. A portion of actuation mechanism 148 is configured to be retracted from loop 150 by an actuator, such as a pyrotechnic actuator or a solenoid, to release the loop, and thus second tether elements 136, from housing 116. Of course, variable tether system 128 may have more than one actuation mechanism 148 for releasing second tether elements 136.

First tether elements 134 have a length that is longer than the length of second tether elements 136. The length of first tether elements 134 is defined as the distance between first end 138 and second end 144. The length of second tether elements 136 is defined as the distance between first end 138 and second end 162.

When actuation mechanism 148 secures second tether elements 136 to housing 116, cushion 120 is allowed to expand to first expanded state 130. Here, second tether elements 136 expand to their full length to allow cushion 120 to expand to first expanded state 130, while first tether elements 134 remains slack.

However, when second tether elements 136 are released from housing 116, cushion 120 is allowed to expand to second expanded state 132. Here, first tether elements 134 expand to their full length to allow cushion 120 to expand to second expanded state, while second tether elements 136 remain slack as the second end 162 of each has been released from mechanism 128.

Accordingly, second tether elements 136 are secured to housing 116 to restrict the cushion 120 from fully expanding to maintain the cushion to first expanded state 130. Releasing second tether elements 136 from actuation mechanism 148 allows first tether elements 134 to extend to their full length, which allows cushion 120 to expand to second expanded state 132. In this manner, variable tether system 128 is configured to provide cushion 120 with an adjustable expanded state.

Again, each of the first and second tether elements are separate and distinct from one another, but the second tether elements are all secured to housing 116 at a central point, namely at actuation mechanism 148. Thus, each tether element can be configured to tailor the first and second expanded state of cushion 120 differently through the activation of one mechanism (e.g., actuation mechanism 48) to release the second tether elements to change between the first and second expanded states.

It should be recognized that actuation mechanism 148 is described above by way of example only. Of course, alternate actuation mechanisms configured to releasably secure second tether element 136 to housing 116 are contemplated for use with the present disclosure.

It should also be noted that the terms "first", "second", and "third", and the like may be used herein to modify elements performing similar and/or analogous functions. These modifiers do not imply a spatial, sequential, or hierarchical order to the modified elements unless specifically stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A variable tether system adapted for use in an inflatable cushion of an airbag module, comprising:

a first pair of tether elements each having a first end and a second end, the first ends each being secured to inner portions of the inflatable cushion and the second ends each being secured to inner portions of the inflatable cushion, the first ends each being secured to the inflatable cushion at positions remote from the second ends and the second ends being secured to the inflatable cushion at a location closer to an inflation opening of the inflatable cushion than the first ends, wherein each of said first pair of tether elements has a portion between each of the first and second ends which is not secured to the inflatable cushion; and a second pair of tether elements each having a first side and a second side, the first side of one of said second pair of tether elements being secured to said portion of one of said first pair of tether elements and the first side of the other one of said second pair of tether elements being secured to said portion of the other one of said first pair of tether elements and the second sides of said second pair of tether elements being configured for being releasably secured to an actuation mechanism.

2. The variable tether system as in claim 1, wherein the inflatable cushion is capable of expanding to a first expanded state when said second pair of tether elements are secured to the actuation mechanism and the inflatable cushion is capable of expanding to a second expanded state when said second pair of tether elements are released from the actuation mechanism, said second expanded state being larger than said first expanded state.

3. The variable tether system as in claim 2, wherein said first expanded state is defined by preventing expansion of said pair of first tether elements to a fully expanded state, said fully expanded state being defined by the distance between the first end and the second end of each of said pair of first tether elements.

4. The variable tether system as in claim 2, wherein the first side of said pair of second tether elements is slidably secured to said portion.

5. The variable tether system as in claim 2, wherein the first side of said pair of second tether elements is fixedly secured to said portion.

6. The variable tether system as in claim 1, wherein the first side of one of said pair of second tether elements is fixedly secured to the second end of one of said pair of said first tether elements and the first side of the other one of said second tether elements is secured to the second end of the other one of said pair of first tether elements.

7. An airbag module having a variable tether system, comprising:

a housing;

an inflatable cushion stored in an un-deployed position in said housing, said inflatable cushion being configured for deployment from said housing;

an inflator stored in said housing in fluid communication with said inflatable cushion, said inflator being configured to generate a quantity of inflation gas to deploy said inflatable cushion from said housing;

a pair of first tether elements each having a first end and a second end, the first ends each being secured to an inner portion of said inflatable cushion and the second ends each being secured to an inner portion of said inflatable cushion, the first ends each being further away from said housing than the second ends as the inflatable cushion inflates;

a pair of second tether elements each having a first side and a second side, the first side of one of said pair of second tether elements being secured to a portion of one of said pair of said first tether elements between said first and second ends and the other one of said pair of second tether elements being secured to a portion of the other one of said pair of said first tether elements between said first and second ends; and an actuation mechanism disposed on said housing, said actuation mechanism being configured to selectively retain or release the second side of each of said pair of second tether elements, said second tether elements restraining said first tether elements, so that said inflatable cushion expands to a first expanded state;

wherein the releasing of said second tether element allows said pair of first tether elements to expand with the inflation of said inflatable cushion so that said inflatable cushion expands to a second expanded state, said second expanded state being larger than said first expanded state.

8. The airbag module as in claim 7, wherein said second expanded state is defined by the expansion of said pair of first tether elements between said first end and said second end.

9. The airbag module as in claim 7, wherein the first side of each of the second tether elements is secured to its corresponding first tether element at a point between the first end and the second end of its corresponding first tether element.

10. The airbag module as in claim 7, wherein said actuation mechanism further comprises a portion configured to engage a second loop defined out of the second side of each of said second tether elements said actuation mechanism being adapted to disengage said portion from said second loop.

11. The airbag module as in claim 7, wherein said pair of first tether elements comprises a plurality of pairs of said first tether elements and said pair of second tether elements comprises a corresponding plurality of pairs of said second tether elements and said actuation mechanism comprises a corresponding number of actuation mechanisms.

12. The airbag module as in claim 11, wherein one of said plurality of pairs of said first tether elements restricts the deployment of the inflatable cushion in a first direction and another one of said plurality of pairs of said first tether elements restricts the deployment of the inflatable cushion in a second direction.

13. The airbag module as in claim 12, wherein the actuation mechanisms are each adapted to receive a signal from a sensing and diagnostic module, said signal instructing the actuation mechanism to release one of said pair of second tether elements.

14. The airbag module as in claim 7, wherein the actuation mechanism is adapted to receive a signal from a sensing and diagnostic module, said signal instructing the actuation mechanism to release said pair of second tether elements.

15. The airbag module as in claim 7, further comprising another actuation mechanism wherein one actuation mechanism releasably retains one of said pair of second tether elements and the other actuation mechanism releasably retains the other one of said pair of second tether elements.

16. The airbag module as in claim 15, wherein the actuation mechanisms are each adapted to receive a signal from a sensing and diagnostic module, said signal instructing the actuation mechanism to release one of said pair of second tether elements.

17. An airbag module, comprising:
a housing;
an inflatable cushion for deployment from said housing;
an inflator in fluid communication with said inflatable cushion and for providing a quantity of inflation gas to deploy said inflatable cushion from said housing;
a variable tether system, comprising:
a first pair of tether elements each having a first end and a second end, the first ends each being secured to inner portions of the inflatable cushion and the second ends each being secured to inner portions of the inflatable cushion, the first ends each being secured to the inflatable cushion at positions remote from the second ends and the second ends being secured to the inflatable cushion at a location closer to an inflation opening of the inflatable cushion, wherein each of said first pair of tether elements has a portion between each of the first and second ends which is not secured to the inflatable cushion; and
a second pair of tether elements each having a first side and a second side, the first side of one of said second pair of tether elements being secured to said portion of one of said first pair of tether elements and the first side of the other one of said second pair of tether elements being secured to said portion of the other one of said first pair of tether elements, the second sides being configured for being releasably secured to an actuation mechanism.

18. The airbag module as in claim 17, wherein the inflatable cushion is capable of expanding to a first expanded state when said second pair of tether elements are secured to said actuation mechanism and the inflatable cushion is capable of expanding to a second expanded state when said second pair of tether elements are released from said actuation mechanism, said second expanded state being larger than said first expanded state.

19. The airbag module as in claim 18, wherein said first expanded state is defined by preventing expansion of said pair of first tether elements to a fully expanded state, said fully expanded state being defined by the distance between the first end and the second end of each of said pair of first tether elements.

20. The airbag module as in claim 18, wherein the first side of said pair of second tether elements is slidably secured to said portion.

21. The airbag module as in claim 17, wherein the actuation mechanism provides a means for securing and releasing at least the first side of one of said second pair of tether elements and said actuation mechanism is adapted to receive a signal from a sensing and diagnostic module, said signal instructing the actuation mechanism to release at least the first side of one of said second pair of tether elements.

* * * * *